United States Patent
Dailey

(10) Patent No.: US 8,742,033 B2
(45) Date of Patent: Jun. 3, 2014

(54) METHOD OF STABILIZING RESORCINOL RESINS AND GEL COMPOSITIONS MADE THEREFROM

(75) Inventor: Theodore Harvey Dailey, East Brady, PA (US)

(73) Assignee: Indspec Chemical Corporation, Pittsburgh, PA (US)

( * ) Notice: Subject to any disclaimer, the term of this patent is extended or adjusted under 35 U.S.C. 154(b) by 371 days.

(21) Appl. No.: 12/637,757

(22) Filed: Dec. 15, 2009

(65) Prior Publication Data

US 2010/0093972 A1      Apr. 15, 2010

Related U.S. Application Data

(63) Continuation of application No. 11/873,419, filed on Oct. 17, 2007.

(60) Provisional application No. 60/865,106, filed on Nov. 9, 2006.

(51) Int. Cl.
$C08G$ 8/04      (2006.01)
(52) U.S. Cl.
USPC .......................... 525/480; 525/481; 525/482
(58) Field of Classification Search
USPC .......................................... 423/445; 525/481
See application file for complete search history.

(56) References Cited

U.S. PATENT DOCUMENTS 4,368,299 A * 1/1983 Watanabe et al. ............. 525/481
5,075,413 A * 12/1991 Dailey, Jr. ..................... 528/129

FOREIGN PATENT DOCUMENTS

WO        WO99/01502        * 1/1999
WO        WO2004/106427   * 12/2004

* cited by examiner

*Primary Examiner* — Patricia L Hailey
*Assistant Examiner* — Colette Nguyen
(74) *Attorney, Agent, or Firm* — Renner Kenner; Arthur M. Reginelli

(57) ABSTRACT

A method of stabilizing a resorcinol-aldehyde resin comprises heating a resorcinol-aldehyde resin in the substantial absence of an acid or base catalyst at a temperature from about 130° C. to about 180° C. for a sufficient amount of time to render the resin stable in an aqueous solution, wherein the resorcinol-aldehyde resin prior to heating is a novolak resin. The stabilized resins have many useful applications. For example, they can be used to make aerogels and xerogels. They also can be used to make dipping solutions to improve the adhesion between rubber and tire cords in a tire, belt, or hose.

17 Claims, No Drawings

METHOD OF STABILIZING RESORCINOL RESINS AND GEL COMPOSITIONS MADE THEREFROM

PRIOR RELATED APPLICATIONS

This application is a continuation application of U.S. patent application Ser. No. 11/873,419, filed Oct. 17, 2007, which claims priority to U.S. Provisional Patent Application Ser. No. 60/865,106, filed Nov. 9, 2006, both of which are incorporated herein by reference in their entirety.

FEDERALLY SPONSORED RESEARCH STATEMENT

Not applicable.

REFERENCE TO MICROFICHE APPENDIX

Not applicable.

FIELD OF THE INVENTION

The invention relates to methods of stabilizing resorcinol novolak resins. The stabilized resorcinol novolak resins have many useful applications. For example, they can be used to make dipping formulations, aerogels, xerogels, etc.

BACKGROUND OF THE INVENTION

Resorcinol is a known material commonly used in resins, dyes, adhesives, pharmaceuticals, and other applications. It can be obtained in a variety of grades and forms, such as crystals, flakes, pellets, and the like. Resorcinol, in its various forms, is soluble in water, alcohol, ether, benzene, glycerol and formaldehyde.

Resorcinol can be used to synthesize carbon aerogels or xerogels. Specifically, carbon aerogel can be produced by the polycondensation of resorcinol and formaldehyde in a slightly basic medium, followed by supercritical drying and pyrolysis in an inert atmosphere. Thin electrodes formed from such carbon aerogels may be used in capacitive deionization applications. Similarly, xerogels can be made by simple evaporation of solvent from the pore system of the gel.

Resorcinol-formaldehyde novolak resin solutions form a paste unless stabilized. Several methods involving acidic or alkaline catalysts for stabilization of resorcinol-formaldehyde resins are known. An acid catalyst combined with heating may be used but may render the resin corrosive. Pastes do not flow and cannot be readily used in automatic mixers. Alternatively, high levels of an alkaline catalyst may be used to keep the materials liquid, but these catalysts thicken the resin and can result in undesirable reactions. The presence of high levels of either acidic or alkaline catalysts in the resins is often undesirable as they can contribute to faster, sometimes uncontrollable reactions when the resins are used.

Therefore, there is a need for a method of stabilizing resorcinol novolak resins in an aqueous solution substantially free of an acid or a base catalyst. In some embodiments, such stabilized resorcinol novolak resins are stable over a relatively long period of time.

SUMMARY OF THE INVENTION

In one aspect, the invention provides a method of stabilizing a resorcinol-aldehyde resin, comprising: heating a resorcinol-aldehyde resin in the substantial absence of an acid or base catalyst at a temperature from about 130° C. to about 180° C. for a sufficient amount of time to render the resorcinol-aldehyde resin stable in an aqueous solution, wherein the resorcinol-aldehyde resin prior to the heating is a novolak resin.

In some embodiments, the resorcinol-aldehyde resin is at least partially soluble in water. In other embodiments, the resorcinol-aldehyde resin is obtainable by reacting a resorcinol compound with an aldehyde compound. In further embodiments, the resorcinol compound is represented by formula (I):

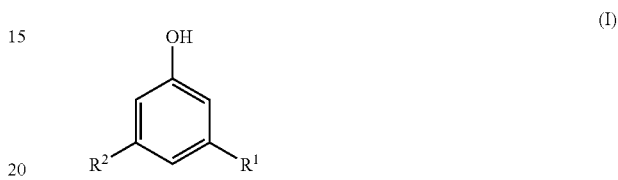

where each of $R^1$ and $R^2$ is independently H, OH, $C_{1-5}$ alkyl, or $OR^3$ where $R^3$ is a $C_{1-5}$ alkyl or aryl, and that at least one of $R^1$ and $R^2$ is OH.

In some embodiments, the aldehyde compound is formaldehyde, methyl formcel, acetaldehyde, propionaldehyde, butyraldehyde, crotanaldehyde, cinnamaldehyde, benzaldehyde, furfural, acetone, methyl ethyl ketone, or a mixture thereof. In other embodiments, the aldehyde compound is a mixture of formaldehyde and butyraldehyde. In other embodiments, the aldehyde compound is formaldehyde. In some embodiments, the resorcinol compound is unsubstituted resorcinol and the aldehyde compound is formaldehyde. In further embodiments, the formaldehyde is a mixture of formaldehyde and water or an aqueous solvent. In some embodiments, the solvent is methanol. In other embodiments, the amount of formaldehyde in the mixture is about 37 wt. %, based on the total weight of the mixture. In further embodiments, the amount of formaldehyde in the mixture is about 50 wt. %, based on the total weight of the mixture.

In some embodiments, the molar ratio of the resorcinol compound to the aldehyde compound is about 1:0.3 to about 1:0.7. In other embodiments, wherein the molar ratio of the resorcinol compound to the aldehyde compound is about 1:0.45 to about 1:0.65.

In some embodiments, the resorcinol-aldehyde resin is obtainable by reacting a resorcinol compound with an aldehyde compound in the substantial absence an acid or base catalyst. In other embodiments, the resorcinol-aldehyde resin is obtainable by reacting a resorcinol compound with an aldehyde compound in the presence of an acid or base catalyst, and the acid or base catalyst is substantially removed or neutralized before heating the resorcinol-aldehyde resin.

In some embodiments, the volatiles present in the reaction mixture are substantially removed before heating the resorcinol-aldehyde resin. In other embodiments, an aqueous solvent is added to the resorcinol-aldehyde resin after heating to make a stabilized solution of the resorcinol-aldehyde resin. In some embodiments the aqueous solvent can be water or a mixture of water/methanol or water/ethanol or water/isopropanol. In further embodiments, water or other aqueous solvent in the reaction mixture is not removed before heating the resorcinol-aldehyde resin. In further embodiments, the heating is carried out under pressure in a device such as an autoclave or other reaction vessels capable of carrying out reactions under pressure.

In another aspect, the invention provides a stabilized resorcinol-aldehyde aqueous solution obtainable by a method comprising heating a resorcinol-aldehyde resin in the substantial absence of an acid or base catalyst at a temperature from about 130° C. to about 180° C. for a sufficient amount of time to render the resorcinol-aldehyde resin stable in an aqueous solution, wherein the resorcinol-aldehyde resin prior to the heating is a novolak resin.

In some embodiments, the resorcinol-aldehyde resin is obtainable by reacting a resorcinol compound with an aldehyde compound, and the resorcinol compound is represented by formula (I):

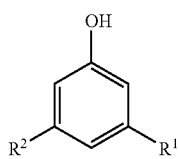
(I)

where each of $R^1$ and $R^2$ is independently H, OH, $C_{1-5}$ alkyl, or $OR^3$ where $R^3$ is a $C_{1-5}$ alkyl or aryl, and that at least one of $R^1$ and $R^2$ is OH.

In another aspect, the invention provides a dip solution for enhancing the adhesion between fabric or glass cords and rubber in a tire, hose, or belt comprising the stabilized resorcinol-aldehyde aqueous solution.

In another aspect, the invention provides a gel obtainable from a stabilized resorcinol-aldehyde aqueous solution, wherein the stabilized resorcinol-aldehyde aqueous solution is obtainable by a method comprising heating a resorcinol-aldehyde resin in the substantial absence of an acid or base catalyst at a temperature from about 130° C. to about 180° C. for a sufficient amount of time to render the resorcinol-aldehyde resin stable in an aqueous solution, wherein the resorcinol-aldehyde resin prior to the heating is a novolak resin.

In some embodiments, the resorcinol-aldehyde resin is obtainable by reacting a resorcinol compound with an aldehyde compound, and the resorcinol compound is represented by formula (I):

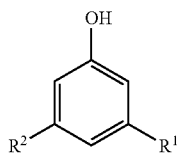
(I)

where each of $R^1$ and $R^2$ is independently H, OH, $C_{1-5}$ alkyl, or $OR^3$ where $R^3$ is a $C_{1-5}$ alkyl or aryl, and that at least one of $R^1$ and $R^2$ is OH.

In some embodiments, the gel is a resorcinol-formaldehyde resin gel. In other embodiments, the gel is an aerogel or a xerogel. In further embodiments, the method further comprises drying the stabilized resorcinol-aldehyde resin to obtain the gel. In still further embodiments, the method comprises adding additional aldehyde and drying the stabilized resorcinol-aldehyde resin to obtain the gel.

In another aspect, the invention provides a carbon foam obtainable by carbonizing the gel. In some embodiments, carbonizing occurs at a temperature from about 600° C. to about 1200° C. In other embodiments, the foam has an average pore size from about 50 nm to about 200 nm. In further embodiments, the foam has a density in the range of about 35 mg/cc to 100 mg/cc. In other embodiments, the foam has an average pore size from about 2 nm to about 100 nm.

Definitions

To facilitate the understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this application.

A composition that is "substantially free" of a compound refers to a composition which contains less than about 5 wt. %, less than about 4 wt. %, less than about 3 wt. %, less than about 2 wt. %, less than about 1 wt. %, less than about 0.5 wt. %, less than about 0.1 wt. %, or less than about 0.01 wt. % of the compound, based on the total weight of the composition.

A novolak resin or novolak reaction that is "substantially free" of a catalyst refers respectively to a novolak resin or novolak reaction which contains less than about 0.1 moles, less than about 0.07 moles, less than about 0.05 moles, less than about 0.04 moles, less than about 0.03 moles, or less than about 0.02 moles of the catalyst per mole of phenolic monomer starting material.

An acid or a base catalyst is "substantially removed" from in a novolak resin refers to the amount of the catalyst in the novolak resin, after the removal, is reduced to less than about 0.1 moles, less than about 0.07 moles, less than about 0.05 moles, less than about 0.04 moles, less than about 0.03 moles, or less than about 0.02 moles of the catalyst per mole of phenolic monomer starting material.

An acid or a base catalyst is "substantially absent" or its "substantial absence" in a novolak resin refers to the amount of the catalyst in the novolak resin is less than about 0.1 moles, less than about 0.07 moles, less than about 0.05 moles, less than about 0.04 moles, less than about 0.03 moles, or less than about 0.02 moles of the catalyst per mole of phenolic monomer starting material.

"Novolak resin" or "resin" refers to a neat novolak resin or a solution of the neat novolak resin. In some embodiments, the novolak resin disclosed herein is a neat novolak resin. In other embodiments, the novolak resin disclosed herein is a novolak resin solution comprising the neat novolak resin and a solvent, such as water, alcohol, or a mixture thereof.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

DESCRIPTION OF EMBODIMENTS OF THE INVENTION

Embodiments disclosed herein provide resorcinol-aldehyde resins stabilized in an aqueous solution, such as water or a mixture of water with other water-miscible solvent(s). The stabilized resins have many useful applications. For example, they can be used to make aerogels and xerogels. They also can be used to make dipping solutions to improve the adhesion between rubber and tire cords in a tire. Various coatings and films can be made from such resins.

The method for making a stabilized resorcinol-aldehyde resin comprises heating a resorcinol-aldehyde resin in the substantial absence of an acid or base catalyst at a temperature from about 130° C. to about 180° C. for a sufficient amount of time to render the resin stable in an aqueous solution. In some embodiments, the resorcinol-aldehyde resin used is a novolak resin which is limited in the amount of crosslinking and the aldehyde used to make the novolak resin has almost, if not all, completely reacted. A novolak resin differs from a resole resin in that a novolak resin has insufficient aldehyde present to react to form an infusible solid. A resole resin has sufficient aldehyde crosslinker present to react to form an infusible or fully-cured state by application of heat, catalyst or time.

Synthesis of Resorcinol-Aldehyde Resins

The resorcinol-aldehyde resins disclosed herein can be prepared or obtainable by reacting or contacting a resorcinol compound (as defined below) with at least an aldehyde compound (as defined below). Many different starting materials can be used to prepare the resorcinol-aldehyde resins, so long as the resulting resins are at least partially soluble in water. By "at least partially soluble in water", it is meant that the resins should dissolve in water by at least 0.5% by weight. In some embodiments, the resins should dissolve in water by at least 1 wt. %, at least 2 wt. %, at least 3 wt. %, at least 4 wt. %, or at least 5 wt. %, based on the total weight of water solution.

Suitable resorcinol compounds can be represented by, but are not limited to, formula (I)

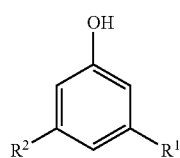

(I)

wherein each of $R^1$ and $R^2$ is independently H, OH, $NH_2$, alkyl, or $OR^3$ where $R^3$ is alkyl or aryl; and at least one of $R^1$ and $R^2$ is OH. In some embodiments, the alkyl group contains one to five carbon atoms. The above formula (I) encompasses various polyhydroxybenzenes, such as di- and tri-hydroxybenzenes. Examples of suitable resorcinol compounds include, but are not limited to, resorcinol (1,3-dihydroxybenzene), catechol (1,2-dihydroxybenzene), hydroquinone (1,4-dihydroxybenzene), and phloroglucinol (1,3,5-trihydroxybenzene). Other suitable resorcinol compounds include, but are not limited to, pyrogallol, 5-methylresorcinol, 5-ethylresorcinol, 5-propylresorcinol, 2-methylresorcinol, 4-methylresorcinol, 4-ethylresorcinol, and 4-propylresorcinol. Suitable substituted resorcinol compounds include, but are not limited to, alkyl substituted resorcinol, aralkyl substituted resorcinol, or a combination of both. Examples of suitable resorcinol derivatives are disclosed in U.S. Pat. Nos. 4,892, 908; 4,605,696; 4,889,891; and 5,021,522, which are incorporated by reference herein in their entirety.

Any aldehyde that reacts with the resorcinol compounds can be used to prepare the resorcinol-aldehyde resins disclosed herein, so long as the resulting resins are at least partially water soluble. In some embodiments, the aldehyde may be represented by formula (II):

$R^4$—CH=O (II)

wherein $R^4$ is H, alkyl, alkenyl, substituted alkyl such as aralkyl, aryl, or substituted aryl such as alkaryl. The alkyl can be $C_{1-5}$ alkyl such as methyl, ethyl, propyl, isopropyl, butyl, isobutyl, pentyl, and the like. In some embodiments, the aldehyde is formaldehyde. Often times, a 37% formaldehyde solution in water and methanol is used. The term "formaldehyde" as used herein also encompasses any substance that can split off or release formaldehyde, such as paraformaldehyde and trioxane. Aldehydes can be used alone or a mixture with an aqueous solvent, such as water or alcohols.

In some embodiments, the aldehyde can be an alkyl aldehyde such as n-butyraldehyde, isobutyraldehyde, valeraldehyde, and combinations thereof. In further embodiments, the aldehyde can be a formaldehyde, an alkyl aldehyde or a combination thereof. When a mixture of aldehydes is used, they can be added to the reaction mixture individually, simultaneously or sequentially.

In addition to formula (II), suitable aldehydes can also include certain unsaturated aliphatic aldehyde compounds and dialdehyde compounds.

Suitable unsaturated aliphatic aldehyde compounds are generally represented by formula (III):

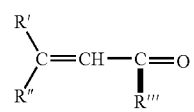

(III)

wherein R', R", and R'" are individually a hydrogen or hydrocarbyl group. The hydrocarbyl group can be straight or branched. For example, each of R', R", and R'" individually can be —H, —$CH_3$, —$C_2H_5$, —$C_3H_7$, —$C_4H_9$, —$C_5H_{11}$, or —$C_6H_{13}$. In some embodiments, R'" is hydrogen or a straight or branched $C_1$-$C_5$ alkyl. Some non-limiting examples of unsaturated aliphatic aldehyde compounds include, but are not limited to, crotonaldehyde, acrolein, and methacrolein.

Suitable aliphatic dialdehyde compounds are generally represented by formula (IV):

$$O=CH \mathbin{\!-\!\!\!\!(} CH_2 \mathbin{\!)\!\!\!\!-\!}_n CH=O$$ (IV)

wherein n is equal to 1 or greater. In some embodiments, n is 1, 2, 3, 4, 5, 6, 7, 8, 9, or 10. In other embodiments, n is 1, 2, 3, 4, or 5. Some non-limiting examples of aliphatic dialdehyde compounds include, but are not limited to, malonaldehyde, succinaldehyde, glutaraldehyde, and adipaldehyde.

The condensation reaction between the aldehyde compound and the resorcinol compound can be carried out in the substantial absence of a catalyst at a temperature from about 40° C. to about 140° C. and under atmospheric pressure. Reaction conditions for such condensation reactions have been disclosed in U.S. Pat. Nos. 4,132,693, 2,128,635, and 3,437,122, which are incorporated by reference herein in their entirety. Conditions disclosed therein can be used with or without modifications in various embodiments disclosed herein.

Although the condensation reaction generally can proceed readily substantially free of a catalyst when using formaldehyde and other lower molecular weight aldehydes, a catalyst may be desirable when some of the higher molecular weight aldehydes are used. Any acidic or basic catalyst known in the art suitable for the condensation reaction of phenolic compounds with aldehydes can be used. Some non-limiting examples of suitable catalysts are disclosed in A. Gardziella, L. A. Pilato, and A. Knop, "*Phenolic Resins: Chemistry, Applications, Standardization, Safety and Ecology*," 2$^{nd}$ Edition, Springer-Verlag, New York, Chapter 2, pp. 24-79 (1999), which is incorporated herein by reference. If a catalyst is used, it is substantially removed or neutralized before heating the resulting resins.

Generally, the molar ratio of the resorcinol compound to the aldehyde compound can be from about 1:0.2 to about 1:0.8. In some embodiments, the molar ratio is from about 1:0.3 to about 1:0.65, from about 1:0.35 to about 1:0.55, from about 1:0.3 to about 1:0.6, from about 1:0.3 to about 1:0.7, or from 1:0.45 to about 1:0.65. In some embodiments, the at least an aldehyde comprises formaldehyde and a second aldehyde. The molar ratio of the second aldehyde to formaldehyde can vary from about 0.25:1 to about 3:1. In some embodiments, the molar ratio is from about 0.35:1 to about 2.5:1; from about 0.5:1 to about 2:1; from about 0.6:1 to about 1.8:1; from about 0.7:1 to about 1.7:1, from about 0.8:1 to about 1.6:1; from about 0.9:1 to about 1.5:1; or from about 1:1 to about 1.2:1.

In other embodiments, resorcinol and formaldehyde undergo a condensation reaction at a molar ratio of 1 mole of resorcinol to 0.3 to 0.6 mole of the total aldehyde (i.e. formaldehyde and alkyl aldehyde) at about 100° C. The condensation reaction product can then be dehydrated at atmospheric pressure or under vacuum at about 140° C. or a lower temperature. The neat resin obtained from this process can be used in the subsequent heat treatment (to be described below). Alternatively, commercial resorcinol-aldehyde resins also can be used instead as a starting material for heat treatment. In still other embodiments, the resin is not dehydrated, and the resin solution is used in the subsequent heat treatment.

As mentioned above, resorcinol-aldehyde novolak resins are used. Generally, the novolak resins are not fully cross-linked. Therefore, it is desirable that the molar ratio of aldehyde to phenolic compound is less than about 1 to prevent cross-linking and/or gelation during manufacture. The novolak resins typically comprise no methylol functionality, have number average molecular weights ($M_n$) in the range of from about 125 to about 5000, and display glass transition temperatures in the range of from about 45° C. to about 100° C. In some embodiments, the $M_n$ is between about 125 and about 800 or between about 800 and about 1500.

Heat Treatment

Once a resorcinol-aldehyde resin is made, the resin can be subject to heat treatment at an elevated temperature for a sufficient period of time to render the resin stable in an aqueous solution. By "stable in an aqueous solution", it is meant that the solution with the resin dissolved therein does not substantially thicken or form a paste as it would had it not been stabilized with an acid catalyst. One way to quantify the stability in an aqueous solution is by the increase in its viscosity over the first ten day period, with the day zero being the day when the resin is stabilized. Typically, the viscosity increase over the first ten day period is no more than about 50%. In some embodiments, the viscosity increase is no more than about 40%, no more than about 30%, no more than about 20%, or no more than about 15%. In some embodiments, the viscosity increase is no more than about 10% or no more than about 5%. In other embodiments, there is no substantially viscosity increase over the first ten day period.

The heat treatment can last from a few hours to several days. In some embodiments, it lasts from about 3 hours to about 20 hours. In other embodiments, it lasts from about 4 hours to about 6 hours, from about 4 hours to about 8 hours, from about 5 hours to about 7 hours, or from about 4 hours to about 7 hours. In some embodiments, the temperature ranges from about 130° C. to about 180° C. In other embodiments, the temperature ranges from about 140° C. to about 170° C., from about 145° C. to about 165° C., from about 150° C. to about 160° C., from about 145° C. to about 160° C., from about 140° C. to about 160° C., or from about 145° C. to about 160° C. In some embodiments, the heat treatment is carried out around 145° C., around 147° C., around 150° C., around 153° C., around 155° C., around 158° C., around 160° C., or around 170° C.

The resin under the heat treatment can either be in molten form or in solution form. In some embodiments, it is in an aqueous solution. If the resin is in molten form, the heat treatment can be conducted in an open reactor or an enclosed reactor with or without the presence of an inert atmosphere. If the resin is in solution form, a reaction vessel capable of operating under pressure such as an autoclave or a similar reactor is used for heat treatment at an elevated temperature.

The heat treatment can be carried out in the substantial absence of an acid or base catalyst. However, depending on the end-use, a small amount of catalyst may be tolerated. Generally, a catalyst should be present in the neat resin or resin solution in an amount of less than 1 wt. % or less than 0.5 wt. %, based on the total weight of the neat resin or of the resin solution respectively. In some embodiments, a catalyst is present in an amount of less than 0.2 wt. %, less than 0.1 wt. %, less than 0.05 wt. %, or less than 0.01 wt. %, based on the total weight of the neat resin or of the resin solution respectively. In other embodiments, a catalyst is present in an amount of less than 300 ppm, 200 ppm, 150 ppm, 70 ppm, 50 ppm, 30 ppm, or 15 ppm, based on the total weight of the neat resin or of the resin solution respectively. It should be noted that while, in some embodiments, an acid or base catalyst is substantially absent in making a novolak resin, it does not mean the resulting neat resin or resin solution is neutral with a pH around 7. In fact, the resulting neat resin or an aqueous solution thereof is generally acidic, with a pH in the range from about 3 to about 5.

If a resin is made with an acid or base catalyst, the catalyst can be substantially removed or neutralized prior to heat treatment. As described above, a resorcinol-aldehyde resin can be made substantially free of an acid or base catalyst. In such a case, no catalyst removal or neutralization is necessary. After the heat treatment, an aqueous solution, such as water, is added to the resin (if it is in molten form) to a desired concentration. If the resin is heat-treated in aqueous form, there may not be a need for adding additional aqueous solvent. However, aqueous solvent addition or distillation may be performed to adjust to a target concentration.

Applications

As mentioned above, the stabilized resorcinol formaldehyde resins have many useful applications. In some embodiments, they can be used to make aerogels, xerogels, etc. In other embodiments, they can be used to make dipping solutions to enhance the adhesion between rubber and tire cords in tires. In further embodiments, they can be used to make various coatings and films.

Aerogels and Xerogels

Xerogels are made by simple evaporation (usually with heating) of solvent from the pore system of the gel. These gels usually are denser and have lower porosity than aerogels. Aerogels can be prepared in a manner similar to that for preparing xerogels. However, in the preparation of aerogels, the solvent can be driven off by using supercritical extraction/drying, freeze drying, or similar methods.

Aerogels have a variety of useful properties. In particular, aerogels are known for their superior insulation properties. These materials have minimal environmental impact since they are air-filled. Furthermore, they are not easily degraded with the passage of time. Aerogels are a singular category of ultra fine (pore sizes in the nanometer range) cell size, low density, open-celled foams. Aerogels have continuous porosity and their microstructure with pore sizes below the mean free path of air is believed to be responsible for their remarkable thermal properties.

Organic aerogels have been made from resorcinol-formaldehyde resins. For example, U.S. Pat. Nos. 4,997,804 and 4,873,218, which are incorporated by reference herein in their entirety, disclose polyhydroxybenzene-formaldehyde aerogels. The methods disclosed therein can be used to prepare aerogels in various embodiments disclosed herein, except a base catalyst is not used in the initial synthesis of the resorcinol-formaldehyde novolak or if used, it is substantially removed or neutralized before heat treatment, although a small amount of base catalyst should be added along with additional formaldehyde during the following formation of the gel. The gel formed in various embodiments can be placed in dilute acid to increase the crosslinking density of the gel. The gel can then be exchanged into an organic solvent that is appropriate for supercritical drying, after which it is supercritically dried. That is, the pore liquid is removed by supercritical drying (i.e., the solvent is removed in its supercritical state) at pressures from about 4 MPa to about 22 MPa, depending on the solvent used. Freeze-drying has also been used; but the resulting aerogels have only been obtained as powders. These aerogels may be further carbonized to yield carbon foams of low densities and ultra-fine cell sizes.

Aerogels can also be prepared without using supercritical drying or freeze drying techniques. Such a method is disclosed in U.S. Pat. No. 6,288,132, which is incorporated by reference in its entirety. Silylated organic resorcinol-aldehyde gels can be prepared by a method comprising: (a) preparing gel comprising a resorcinol-aldehyde resin; (b) removing substantially all water from the gel; (c) extracting the gel with a solvent in which a silylating agent is soluble; (d) treating the gel with the silylation agent; and (e) drying the treated gel.

In the above method, substantially all of the water is removed from the gel by extraction with a first solvent, which can be either a protic solvent (e.g., an alcohol) or an aprotic solvent (e.g., hexane, acetone or tetrahydrofuran). If the silylating agent of choice is not soluble in the first solvent, then a second solvent in which the silylating agent is soluble (for example, acetone, toluene or tetrahydrofuran) can be used to further extract the gel to remove the first solvent. The extracted gel can then be silylated by stirring the gel in a solution of the first, second, or a third solvent, for example, hexane and a silylating agent. The molar ratio of silylating agent:recorcinol-aldehyde gel can be between from about 0.1:1 to about 2:1, or from about 0.1:1 to about 1.5:1.

Suitable silylating agents include, but are not limited to, organosilanes, organosilylamines, and organosilazanes. Examples of suitable silanes include, but are not limited to, chlorotrimethylsilane ($(CH_3)_3SiCl$), dichlorodimethylsilane ($(CH_3)_2SiCl_2$), bromochlorodimethylsilane ($(CH_3)_2SiBrCl$), chlorotriethylsilane ($(C_2H_5)_3SiCl$) and chlorodimethylphenylsilane ($(CH_3)_2Si(C_6H_5)Cl$). Examples of suitable silazanes include 1,2-diethyldisilazane ($C_2H_5SiH_2NHSiH_2C_2H_5$), 1,1,2,2-tetramethyldisilazane ($(CH_3)_2SiHNHSiH(CH_3)_2$), 1,1,1,2,2,2-hexamethyldisilazane ($(CH_3)_3SiNHSi(CH_3)_3$), 1,1,2,2-tetraethyldisilazane ($(C_2H_5)_2SiHNHSiH(C_2H_5)_2$) and 1,2-diisopropyldisilazane ($(CH_3)_2CHSiH_2NHSiH_2CH(CH_3)_2$).

Some non-limiting examples of silylating agents include, but are not limited to, silazanes, N,O-bis(trimethylsilyl)-acetamide ($CH_3C(OSi(CH_3)_3)=NSi(CH_3)_3$ and N,O-bis(trimethylsilyl)-trifluoroacetamide ($CF_3C(OSi(CH_3)_3)=NSi(CH_3)_3$).

The process can be performed at ambient pressure conditions. Treating the gel with the silylating agent can be performed at from ambient temperature to solvent reflux temperature. The gel can be separated from the solvent, washed with a solvent, and then dried at a temperature of from ambient temperature to about 130° C. The silylated organic gel made by this process comprises from about 0.01% to about 25% by weight silicon.

The xerogels can be produced by drying the gel at ambient or elevated temperature conditions, without addition of a solvent. In some embodiments, xerogels can substitute directly for aerogels. In other embodiments, xerogels can be manufactured from the same stabilized resorcinol formaldehyde novolak resin disclosed herein.

The aerogels produced in various embodiments disclosed herein may be carbonized by heating them at temperatures in the range of about 600° C. to about 1200° C., in a nitrogen atmosphere, to yield carbon foams of very low densities and ultra-fine cell size or microcellular structure. Such resorcinol-aldehyde carbon foams exhibit a variety of densities from about 35 mg/cc to about 100 mg/cc. The carbon foams were transparent, red in color and showed an openly porous structure with cell sizes of less than 0.1 microns.

In some embodiments, the carbon foams disclosed herein have an average pore size from about 50 nm to about 200 nm, from about 25 nm to about 175 nm, from about 10 nm to about 150 nm or from about 2 nm to about 100 nm.

Some alkaline metal salts, such as lithium, sodium, potassium, ammonium salts, of various dihydroxy benzoic acids, for example, 2,4-dihydroxybenzoic acid, may also be incorporated into the foam matrix during synthesis. After the polymerization, other metal ions and metal salts, such as lead acetate, rubidium carbonate, thallium acetate and the like, may also be incorporated into the crosslinked network. These modified gels may be acidified with a suitable acid, such as chloracetic acid to expose the original carboxyl groups, for the incorporation of metal ions or other cations. Other functional groups or moieties may also be attached to the gel, as desired, for use in ion exchange reactions, such as the removal of contaminant metal species from waste water and the like or as chromatographic separation media. Carbon foams formed by the carbonization of the aerogels may be further used as structural parts where X-ray opacity may be a requirement and as electrode materials as taught in U.S. Pat. Nos. 5,977,015 and 6,737,455, which are incorporated by reference in their entirety.

Dipping Formulations

The stabilized resorcinol-aldehyde resins disclosed herein can also be used to prepare various dipping formulations, such as those for treating rubber reinforcing materials. In some embodiments, the dipping formulation comprises the stabilized resorcinol-aldehyde resin without a latex. In other embodiments, the dipping formulation is a single dipping (i.e., single step) or double dipping (i.e., double step) formulation further comprising a resorcinol-formaldehyde-latex (RFL) for various industrial applications. For example, either the single- or double-dipping RFL formulation can be used to treat rubber reinforcing materials used in rubber compositions. Any rubber reinforcing material known in the art can be used, including, but not limited to, polyesters, polyamides (e.g., nylons and aramid), polyvinyl alcohol, carbon, glass, polybenzoxazole, rayon, and other organic or inorganic compositions. These rubber reinforcing materials may be in the form of filaments, fibers, cords, or fabrics.

Polyester fibers, yarns, filaments, cords or fabric coated with the dipping formulations comprising the stabilized resorcinol-aldehyde resin disclosed herein can be used in the manufacture of radial, bias, or belted-bias passenger tires, truck tires, motorcycle or bicycle tires, off-the-road tires, airplane tires, transmission belts, V-belts, conveyer belts, hose, and gaskets.

Other Uses

In addition to their use as ingredients in fabric dipping formulations, the stabilized resorcinol-aldehyde resins disclosed herein can used to make coatings, films, etc. The resins can be functionalized for various purposes. The functionalized stabilized resorcinol-aldehyde resin may contain useful functional groups, such as hydroxyl, carboxyl, amine, epoxy, that may be used for other applications, such as coatings and composites.

The following examples are presented to exemplify embodiments disclosed herein. All numerical values are approximate, even though the word "about" or "approximate" is not used. When numerical ranges are given, it should be understood that embodiments outside the stated ranges may still fall within the scope disclosed herein. Specific details described in each example should not be construed as necessary features of the invention.

EXAMPLES

In the following examples, various resorcinol formaldehyde resins were prepared and stabilized according to the following procedures. The reaction and stabilization conditions are set forth in Table 1 below.

Step 1. To a reaction flask fitted with a stirrer, a condenser and a heating mantle, resorcinol was added according to Table 1 for each example, heated until molten, and stirred.

Step 2. The piping was set for reflux and cooling water was applied to the condenser. At 110° C. to 140° C., formaldehyde was added from a dropping funnel slowly, at a rate so as not to overload the condenser during reflux. Typical addition time was from ½ hour to 2½ hours.

Step 3. After all formaldehyde had been added, the reaction flask piping was switched to allow atmospheric distillation. The reaction mixture was heated to 130° C. while water was distilled.

Step 4. At 130° C., the setup was prepared for vacuum distillation and a vacuum was applied slowly so as not to cause the resorcinol-formaldehyde resin to surge into overheads or the condenser. The remaining water was distilled off at a temperature of 155° C. and 27 to 28 inches of vacuum. The reaction mixture was held for 15 minutes at those conditions.

Step 5. The vacuum was released and the reaction mass was held at 155° C. for the time periods specified in the table.

Step 6. When full heat treating time had been achieved, the mantle set point was lowered to 130° C. The reaction piping was returned to reflux setup and water was added as per Table 1. Water was added slowly so resin did not solidify. After about 10% of the water was added, the set point was lowered gradually while the water addition continued.

Step 7. After water had been added, while mixing, the reaction mass was cooled to 60° C. or lower and methanol was added slowly. The reaction mixture was mixed thoroughly and decanted. After the stabilized resin solution was obtained, various viscosity measurements were made at certain time interval according to Table 1.

Viscosity Determination for Resin Solutions Using a Brookfield Viscometer, Models RV and LV: about 400 g of a resin solution or liquid resin was placed in a 600 ml beaker and the temperature was adjusted to 23.0° C. +/−0.1° C. The viscosity was measured at 10 rpm or 20 rpm with a spindle selected to place the reading in the 10% to 90% range of the scale. The machine was allowed to spin for 1 minute then the reading was recorded. The calculation is as follows:

Viscosity in centipoises equals the reading on 0-100 scale times a factor. Viscosity in poises equals the reading on the scale times the factor, divided by 100. The factor is obtained from the viscometer tables supplied by Brookfield. It is determined by the rpm and spindle used.

TABLE 1

| Example No. | 1 | 2 | 3 | 4 | 5 | 6 | 7 | 8 | 9 | 10 | 11 |
|---|---|---|---|---|---|---|---|---|---|---|---|
| Formaldehyde: Resorcinol Ratio | 0.50:1 | 0.50:1 | 0.50:1 | 0.50:1 | 0.50:1 | 0.35:1 | 0.65:1 | 0.65:1 | 0.35:1 | 0.65:1 | 0.35:1 |
| Hours Held at 150-160° C. | 4 | 6 | 8 | 18 | 6 | 4 | 4 | 0 | 0 | 9 | 9 |
| Charge, in g | | | | | | | | | | | |
| Resorcinol | 220.2 | 220.2 | 220.2 | 220.2 | 220.2 | 220.2 | 220.2 | 220.2 | 220.2 | 220.2 | 220.2 |
| Formaldehyde, 37.2 wt. % | 80.7 | 80.7 | 80.7 | 80.7 | 807.3 | 56.5 | 104.9 | 104.9 | 56.5 | 104.9 | 56.5 |
| Water | 59.8 | 59.8 | 59.8 | 59.8 | 598.5 | 41.9 | 77.8 | 77.8 | 41.9 | 77.8 | 41.9 |
| Methanol | 8.9 | 8.9 | 8.9 | 8.9 | 88.8 | 6.2 | 11.5 | 11.5 | 6.2 | 11.5 | 6.2 |
| Viscosity (poise) | | | | | | | | | | | |
| Day 0 | 9.8 | 10.5 | 11.5 | 12 | | | | | | | |
| Day 1 | | | | | | 10.8 | 25.3 | paste | 4 | | 9.8 |
| Day 2 | | | | | | | | | | 45 | |
| Day 3 | | | | | | | | | 4.2 | | |
| Day 4 | | | | | | 12.4 | 174 | | | | |
| Day 5 | | | | | | | | | 4 | | |
| Day 6 | | | | | | 12 | 176.8 | | | | |
| Day 7 | | | | | | | | | Precipitate | 58.4 | 14.5 |
| Day 8 | | | | | | 12.5 | 236 | | | | |
| Day 9 | | 10 | | | | 12 | | | | | |
| Day 10 | | | | 15.7 | | | | | | | |
| Day 11 | | | 13.9 | | | | | | | | |

TABLE 1-continued

| Example No. | 1 | 2 | 3 | 4 | 5 | 6 | 7 | 8 | 9 | 10 | 11 |
|---|---|---|---|---|---|---|---|---|---|---|---|
| Day 13 |  | 13.5 |  |  |  |  | 13.3 | Paste |  |  |  |
| Day 19 | 10 |  |  | 15.7 |  |  |  |  |  |  |  |
| Day 20 | 10 |  | 13.6 |  |  |  |  |  |  |  |  |
| Day 22 |  | 13.6 |  |  |  |  |  |  |  |  |  |
| Day 26 |  |  |  | 15.9 |  |  |  |  |  |  |  |
| Day 27 |  |  | 14.2 |  |  |  |  |  |  |  |  |
| Day 28 | 13.6 |  |  | 16.5 |  |  |  |  |  |  |  |
| Day 29 | 13.6 | 13.5 | 14 |  |  |  |  |  |  |  |  |
| Day 31 |  | 13.1 |  |  |  |  |  |  |  |  |  |
| Day 33 |  |  |  | 16.4 |  |  |  |  |  |  |  |
| Day 34 |  |  | 14 |  |  |  |  |  |  |  |  |
| Day 35 | 14 |  |  |  |  |  |  |  |  |  |  |
| Day 36 | 14 | 13.6 |  |  |  |  |  |  |  |  |  |
| Day 37 | 16.8 |  |  |  |  |  |  |  |  |  |  |
| Day 38 | 16.8 |  |  |  |  |  |  |  |  |  |  |
| Day 40 |  |  |  | 16.3 |  |  |  |  |  |  |  |
| Day 41 |  |  | 14 |  |  |  |  |  |  |  |  |
| Day 43 |  | 20 | 13.9 |  |  |  |  |  |  |  |  |
| Day 50 | 24.4 |  |  |  |  |  |  |  |  |  |  |
| Day 54 |  |  |  | 16 |  |  |  |  |  |  |  |
| Day 55 |  |  | 17.3 |  |  |  |  |  |  |  |  |

In the above examples, the viscosities of some aqueous solutions of the resorcinol-formaldehyde resins heat-treated according to embodiments disclosed herein are relatively low and remain low after a relatively long period of time, such as 30 days. This suggests that such resorcinol-formaldehyde resins are stabilized in the aqueous solution. Gel compositions can be made from such solutions.

As demonstrated above, embodiments disclosed herein provide a method of stabilizing resorcinol-aldehyde resins in an aqueous solution. The stabilized resin solutions can be used to make dipping formations. The stabilization does not require the use of an acid or base catalyst, thus making various applications possible where the presence of an acid or base catalyst cannot be tolerated. Gel compositions can be made from the stabilized resorcinol-aldehyde resins. Such gel compositions, in turn, can be used to make aerogels, xerogels, etc. As a result, new synthetic routes for such products are provided. The use of stabilized resorcinol-aldehyde resin solutions in aerogel and xerogel applications eliminates an early synthesis step which is often plagued by hard-to-control exothermic or runaway reactions.

While the invention has been described with respect to a limited number of embodiments, the specific features of one embodiment should not be attributed to other embodiments. No single embodiment is representative of all aspects of the inventions. In some embodiments, the compositions may include numerous compounds not mentioned herein. In other embodiments, the compositions do not include, or are substantially free of, any compounds not enumerated herein. Variations and modifications from the described embodiments exist. The method of making and stabilizing the resins is described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. A method of stabilizing a resorcinol-aldehyde resin, comprising:
   a) obtaining a neat resorcinol-aldehyde novolak resin that is substantially free of a catalyst; and then
   b) heating the neat resorcinol-aldehyde novolak resin that is substantially free of a catalyst at a temperature from about 130° C. to about 180° C. for a sufficient amount of time to render the resorcinol-aldehyde resin stable; and then
   c) adding an aqueous solvent to the stable resorcinol-aldehyde resin to make a stabilized solution of the resorcinol-aldehyde resin, where the stabilized resin in aqueous solution does not undergo a viscosity increase of more than 50% over 10 days from the time the aqueous solution is prepared.

2. The method of claim 1, wherein the neat resorcinol-aldehyde novolak resin is obtainable by reacting a resorcinol compound with an aldehyde compound to form a condensation reaction product and then by dehydrating the condensation reaction product.

3. The method of claim 2, wherein the resorcinol compound is represented by formula (1):

(I)

where each of $R^1$ and $R^2$ is independently H, OH, $C_{1-5}$ alkyl, or $OR'$ where $R^3$ is a $C_{1-5}$ alkyl or aryl, and that at least one of $R^1$ and $R^2$ is OH.

4. The method of claim 2, wherein the aldehyde compound is formaldehyde, methyl formcel, acetaldehyde, propionaldehyde, butyraldehyde, crotonaldehyde, cinnamaldehyde, benzaldehyde, furfural, or a mixture thereof.

5. The method of claim 2, wherein the aldehyde compound is formaldehyde.

6. The method of claim 2, wherein the resorcinol compound is unsubstituted resorcinol and the aldehyde compound is formaldehyde.

7. The method of claim 2, wherein the molar ratio of the resorcinol compound to the aldehyde compound is from about 1:0.3 to about 1:0.7.

8. The method of claim 2, wherein the molar ratio of the resorcinol compound to the aldehyde compound is from about 1:0.45 to about 1:0.65.

9. The method of claim 1 wherein the neat resorcinol-aldehyde novolak resin is heated in step b) in the absence of a vacuum.

10. The method of claim 1 wherein the neat resorcinol-aldehyde novolak resin is heated in step b) for a time of at least about three hours.

11. The method of claim 1 where the neat resorcinol-aldehyde resin is heated at a temperature of about 140C to 170C.

12. A method for making an aqueous stabilized resorcinol-aldehyde resin solution, the method comprising:
   (i) reacting a resorcinol compound with an aldehyde compound to form a condensation product;
   (ii) dehydrating the condensation product;
   (iii) heating the product of step (ii), while the resin is in its molten state, for at least 3 hours at a temperature of about 130° C. to 180° C.; and
   (iv) after said step of heating for at least 3 hours, adding water to the molten resin to form an aqueous solution of stabilized resin,
   where the stabilized resin in aqueous solution does not undergo a viscosity increase of more than 50% over 10 days from the time the aqueous solution is prepared.

13. The method of claim 12, where said step of heating takes place at atmospheric pressure.

14. The method of claim 12, where said step of heating heats a resin that is substantially free of catalyst.

15. The method of claim 14, where the resin includes less than 0.1 moles of the catalyst per mole of the phenolic compound employed in said step of reacting.

16. The method of claim 14, where the resin includes less than 0.05 moles of the catalyst per mole of the phenolic compound employed in said step of reacting.

17. The method of claim 12, where said step of heating takes place in the absence of vacuum.

* * * * *